(12) United States Patent
Wong et al.

(10) Patent No.: US 9,256,360 B2
(45) Date of Patent: Feb. 9, 2016

(54) SINGLE TOUCH PROCESS TO ACHIEVE DUAL TOUCH USER INTERFACE

(75) Inventors: Ling Jun Wong, Escondido, CA (US); True Xiong, San Diego, CA (US)

(73) Assignee: Sony Corporation, Tokyo (JP)

( * ) Notice: Subject to any disclaimer, the term of this patent is extended or adjusted under 35 U.S.C. 154(b) by 181 days.

(21) Appl. No.: 12/868,618

(22) Filed: Aug. 25, 2010

(65) Prior Publication Data

US 2012/0050171 A1 Mar. 1, 2012

(51) Int. Cl.
*G06F 3/041* (2006.01)
*G06F 3/0488* (2013.01)
*G06F 3/044* (2006.01)

(52) U.S. Cl.
CPC ............ *G06F 3/04883* (2013.01); *G06F 3/044* (2013.01)

(58) Field of Classification Search
CPC ....................................................... G06F 3/041
USPC ............ 345/173–177, 179; 178/18.01–18.11, 178/19.01; 715/864
See application file for complete search history.

(56) References Cited

U.S. PATENT DOCUMENTS

| 6,330,009 | B1 | 12/2001 | Murasaki et al. | |
|---|---|---|---|---|
| 7,508,374 | B2 * | 3/2009 | Tsunoda | 345/158 |
| 8,289,316 | B1 * | 10/2012 | Reisman et al. | 345/419 |
| 2004/0027397 | A1 * | 2/2004 | Sato | 345/863 |
| 2005/0001815 | A1 * | 1/2005 | Tsunoda | 345/158 |
| 2005/0046621 | A1 | 3/2005 | Kaikuranta | |
| 2009/0061948 | A1 * | 3/2009 | Lee et al. | 455/566 |
| 2009/0201261 | A1 * | 8/2009 | Day | 345/173 |
| 2009/0237371 | A1 * | 9/2009 | Kim et al. | 345/173 |
| 2009/0303188 | A1 | 12/2009 | Triplett | |
| 2009/0303231 | A1 * | 12/2009 | Robinet et al. | 345/419 |
| 2009/0322699 | A1 | 12/2009 | Hansson | |
| 2010/0125786 | A1 * | 5/2010 | Ozawa et al. | 715/702 |
| 2010/0188353 | A1 | 7/2010 | Yoon et al. | |
| 2010/0207901 | A1 | 8/2010 | Shin | |
| 2011/0018818 | A1 * | 1/2011 | Iwano | 345/173 |
| 2011/0074710 | A1 * | 3/2011 | Weeldreyer et al. | 345/173 |
| 2011/0074716 | A1 | 3/2011 | Ono | |
| 2011/0193795 | A1 * | 8/2011 | Seidman et al. | 345/173 |
| 2011/0298830 | A1 * | 12/2011 | Lam | 345/661 |

FOREIGN PATENT DOCUMENTS

| EP | 0762264 | 2/2002 |
|---|---|---|
| KR | 10-2007-0096547 | 6/2012 |

* cited by examiner

*Primary Examiner* — Kent Chang
*Assistant Examiner* — Scott Au
(74) *Attorney, Agent, or Firm* — John L. Rogitz; John M. Rogitz (57) ABSTRACT

A process to experience a two touch interface with single touch functionality is disclosed. Use of two fingers simultaneously presents a degree of freedom constraint on the hand. In an embodiment of the present invention, the simultaneous two touch interface is simulated using a single touch process. In a special input mode, a mechanism is used to first fix a point of reference. A second and subsequent single touch with respect to the fixed point of reference is then made. The time skewed touches enable free use of the index finger for both touches. Closed figures are easily drawn and zoom in and zoom out functions are similarly implemented by a point of reference and a line traced away from or to the object. Limitations of the dual touch are overcome, while maintaining full interface capability of the dual touch.

23 Claims, 11 Drawing Sheets

SINGLE TOUCH PROCESS TO ACHIEVE DUAL TOUCH USER INTERFACE

FIELD

Embodiments of the present invention relate generally to a touch based user input interface for a computer system.

BACKGROUND

Touch technologies are the latest development in human interface techniques to computational and communication devices. Due to the paradigm changes imposed on the semiconductor technology by Moore's law, improvements in speed and response time of computer systems allow users to interface with computer systems using their fingers.

The keyboard was an early form of user input interface to the computer. It migrated naturally from the typewriter world. The mouse was added to the user interface as another natural and faster way of user input. Noteworthy is that the main driver for this advancement was the development of silicon technology, which allowed a graphical user interface to be supported. Fast movement of the cursor on the screen in response to mouse movement and on-screen selection rather than specification of textual input minimized typing on the keyboard. This represented another paradigm shift to the extent that most computers and notebooks started to use a mouse.

The semiconductor technology has further advanced. Whereas when the mouse was introduced, a graphical user interface became a useful user interface, the technology in screen and graphics hardware and device drivers has advanced another quantum to enable touch technologies. The functions of the keyboard and the mouse are being replaced by a more direct human interface. The keyboard interface is being simulated by touch as well, on the screen. This is attractive as it manifests tremendous power in the user's hand. The computing power for screen manipulation has improved substantially to react to multiple touches for sensing touches (detection), positioning touches (resolution), cognition of touches and responses to touches. These operations are now supportable on hand-held devices at response times conducive to user interaction.

Single touch occurs when a finger or stylus creates a touch on the surface of a touch sensor. It is subsequently detected by a touch controller. The application can determine the coordinates of the touch event. Touch technologies have been integrated into many devices. These devices typically do not have the ability to detect or resolve more than a single touch point at a time. Pens enable the same input characteristics as a finger, but with greater pointer accuracy. Active pens can provide more control and uses for the touch system such as drawing and palm rejection capabilities.

Improvements to firmware, software and hardware by many single touch technologies have increased their touch functionality. Some touch technologies can use advanced processing capabilities to "detect" or recognize that a second touch event is occurring. Unfortunately, single touch systems cannot resolve the exact location of the second touch event. Instead, they rely on processes to interpret the intended gesture event input.

The "two touch" refers to a touch system that can detect and resolve two distinct, simultaneous touch events. Drawing two parallel lines on the screen at the same time is an example of the "two touch." The multi-touch refers to a touch system's ability to simultaneously detect and resolve a minimum of three or more touch points. All three or more touches are detected and fully resolved. This results in an improved touch experience. Multi-touch is considered to become a widely-used interface. This is due to its efficiency, speed and intuitiveness of the technology. Multi-touch technology enables users to pinch, swipe, rotate, and other actions. These allow for richer and more direct interaction with digital content. For an exemplary application, photographs can be rotated, resized and moved individually and in groups.

The two finger multi touch system has some advantages. Since simultaneous use of two fingers is required, restrictions are placed on the allowable movement of the user. For example, it is very hard to draw a circle with a finger and a thumb or with two fingers. Limitations of the human palm place hard constraints on the user's ability to complete a circle in one pass. This is also true for any close ended figure, that is much easier to draw using one finger. A user's hand usage is heavily biased towards the use of the index finger or the index finger and the thumb. Therefore, improvements to two finger simultaneous touch interfaces are needed.

SUMMARY

An embodiment of the present invention is directed to a single touch process to achieve a dual touch experience. While dual touch technology may make sense for some applications, the natural tendency of a user is to use to the index finger and if necessary, the thumb. The structure of the hand places many degrees of freedom constraints regarding user movement performing simultaneous multi-touch or dual touch interactions. Embodiments of the present invention allow the user to use the index finger for both touches of a simulated dual touch interface.

The embodiments of the present invention provide processes to mimic simultaneous dual touch interface by using single touch techniques in which the index finger can be used for both touches. The touch screen system is placed in a beacon mode. This mode is peculiar to the inventive dual touch experience. In one embodiment, through either a double tap or a triple tap, the touch screen system is placed in this special mode. In this mode, a one touch at a time method is used to simulate the inventive dual touch experience. An embodiment of the present invention allows the user to mark a single point of reference with subsequent touches recognized relative to that reference to define an action. The point of reference can be established either by selecting a trigger on the screen or when pressure from a touch larger than a certain threshold is detected. The establishment of the reference point fixes the first point and actions happen with respect to the second subsequent point. For instance, a closed figure is easily drawn, including a circle by simply fixing the reference at the center and using one finger, preferably the index finger to draw. If the technique is accidently used in an application where dual touch is not relevant, the mode is disregarded.

An embodiment of the present invention discloses a touch interface method, apparatus and software where a first user interaction enables a mode of operation. A second user interaction establishes a point of reference. Graphical functions construct images based on a third user interaction relative to the second user interaction. In one embodiment of the present invention, the user interaction is a touch on the screen.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be include within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Figure 1:
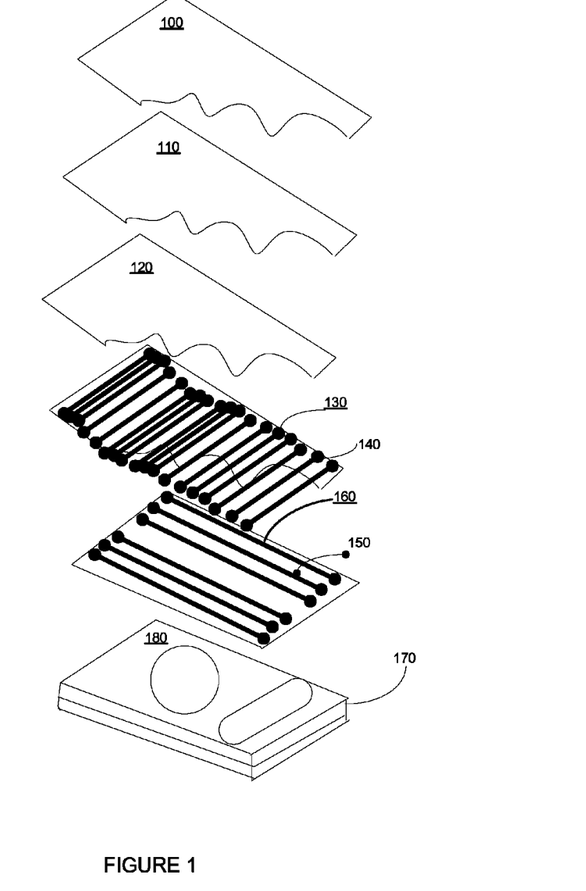
FIG. 1 is a layer by layer diagram of an exemplary capacitive touch-screen containing a grid of sensing and driving lines that can be used with embodiments of the present invention.

Referring to FIG. 1, an embodiment of an exemplary capacitive screen is described that may be used with embodiments of the present invention. In an exemplary embodiment, it contains a grid of sensing lines and driving lines to determine where the user is touching. Layer 1 of the layers is a protective anti-reflective coating 100. This is followed by the protective cover 110 which improves the durability of the screen. Layer 120 is the bonding layer to isolate the electrical circuits and maintain their integrity. Layer 130 has driving lines to precharge, as an example, a capacitor. Layer 130 has exemplary driving lines 140. These lines are associated with capacitors on columns of a screen. Similarly, layer 160 has sensing lines 150 which cover the rows on the screen. Each pixel has a row position and a column position with precharging occurring on the capacitors at the pixel positions through the driving lines 140 and discharging occurring through sensing lines 160. The charging and discharging create electrical impulses which are detected pixel-by-pixel on the screen to sense touch and locate the touch coordinates (via rapid column and row scanning). Layers 180 and layers underneath it represented by 170 are the liquid crystal display layers to display data. FIG. 1 represents an exemplary multi-layer display with touch sensing capability. In one embodiment of the present invention, the touch sensing functionality of the claim shown in FIG. 1 is limited to single touch.

Figure 2:
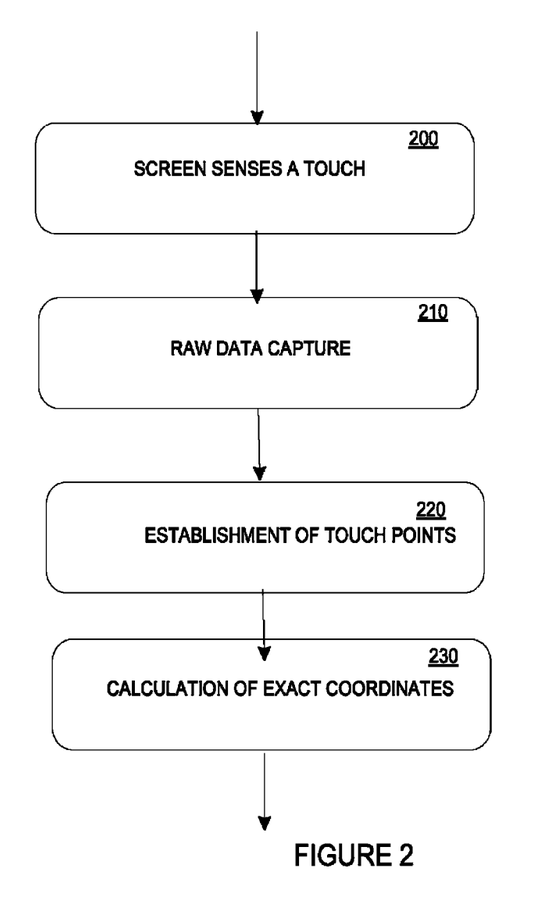
FIG. 2 is a flow chart of a process for touch sensing from the touch to coordinate calculation.

FIG. 2 shows exemplary driver level software steps used in touch sensing. In the step 200, the screen senses a touch through the interaction, in one embodiment, of charge in a finger. Raw data is captured in terms of charge amount of the pixels 210. After additional processing to remove the noise, the step of establishment of touch points 220 follows next. Calculation of exact coordinates 230 in terms of pixel number(s) on the screen occurs after this.

Figure 3A:
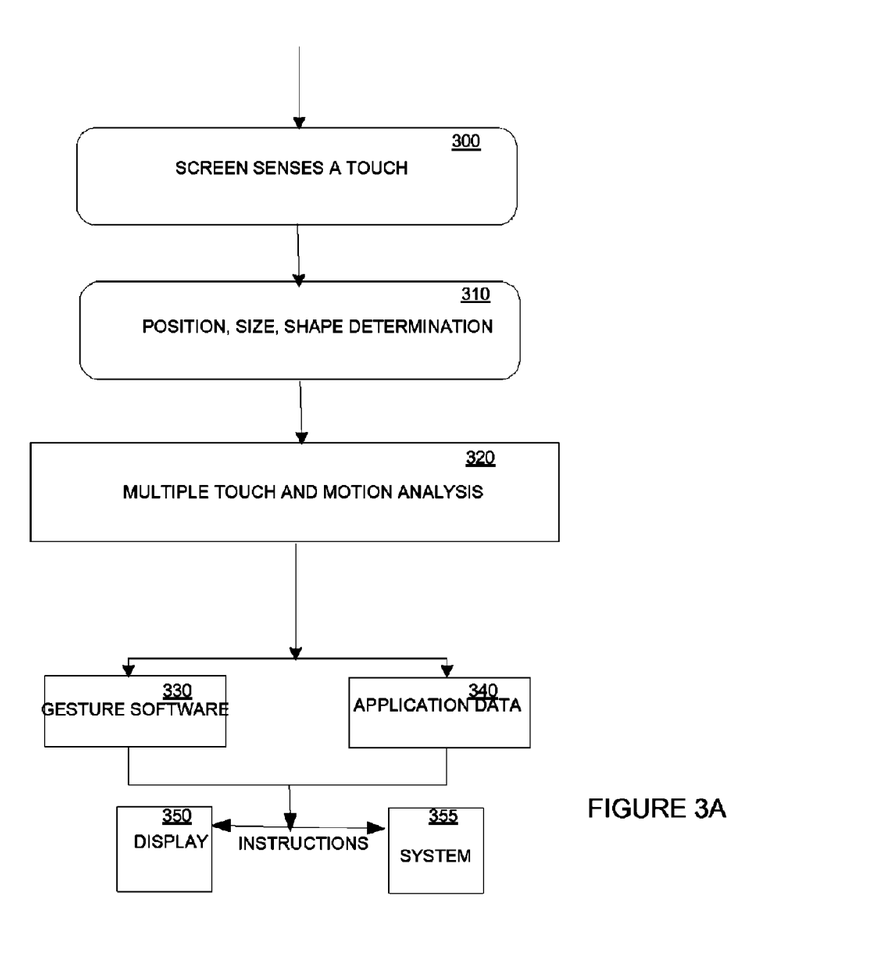
FIG. 3A is a flow chart showing a flow of touch input through the processor and the software where raw data is interpreted as commands and gestures.

FIG. 3A further illustrates the touch system processes. The process starts with the user touching the screen that is then sensed 300. Through the electronics underlying, the touch is located, positioned and its size and shape determined 310 using a process such as FIG. 2. Motion and multiple touch analysis occurs 320. The information so derived, which is the interpretation of the touch and its cognition, is fed to gesture software 330, in accordance with embodiments of the present invention, and also to application data 340. The processor uses its gesture-interpretation software in accordance with embodiments of the present invention, to determine which gesture was made. Physical movements are combined with the context of the application. The processor relays the instructions to the program in use. Both of these blocks 330 and 340 working together provide instructions to the display driver 350 and system 355 to update images on the screen. Commands may be sent to the screen and other hardware. An extraneous touch, not matching any gestures or commands is disregarded. In accordance with one embodiment, the touch system employed is limited to single touch recognition.

Figure 3B:
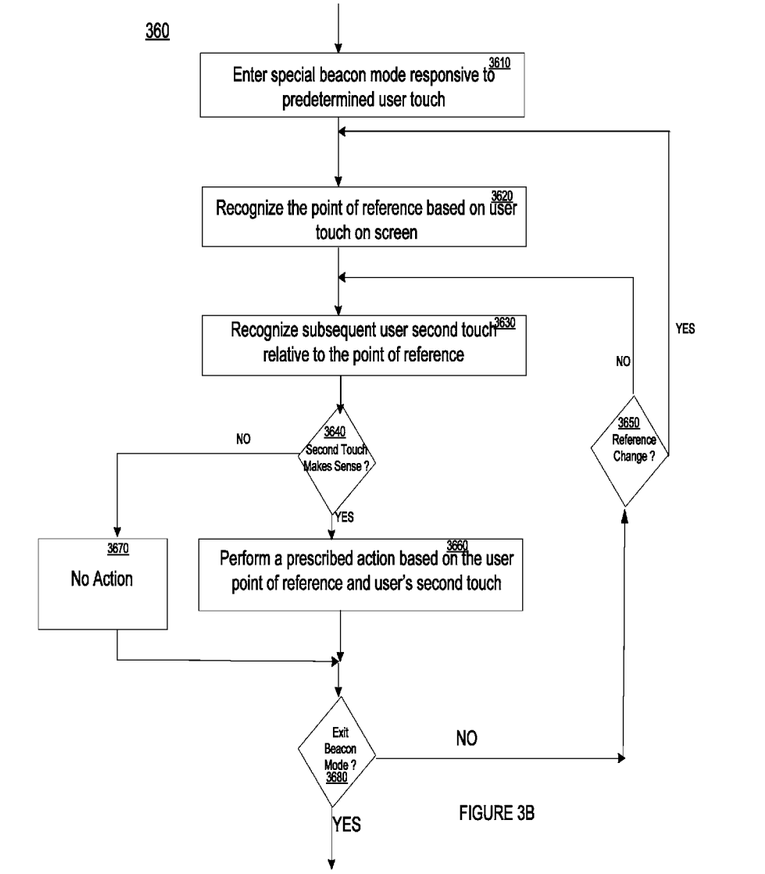
FIG. 3B is a flow chart of the steps involved to achieve a simultaneous dual touch experience with single touch processes in accordance with embodiments of the present invention.

FIG. 3B illustrates an embodiment of the present invention as an enhancement to the gesture software 360 to provide a "dual touch" interface while using only single touch input. Using the process 360, "dual touch" is effectively simulated. The touch screen enters a special beacon mode responsive to a predetermined user touch 3610. Based on a user touch on the screen, a point of reference is recognized 3620. A subsequent user touch is recognized relative to the point of reference 3630. In one embodiment of the present invention, based on the application, a decision is made whether the second touch has significance 3640. If it has no significance, no action is taken. The second touch is disregarded. As an example, browsing through an address book requires scrolling and selecting. If a user unintentionally activates the point of reference, swiping the finger down the screen will still execute the scrolling action, because a touch moving towards the point of reference does not make sense in this application.

On the other hand, if the second touch has significance, a prescribed action is taken based on the point of reference and the user's second touch 3660. If the user wishes to exit the "beacon" mode, the process ends 3680. Otherwise, if the user wishes to change the reference point 3650, the process to recognize the new reference is entered 3620. If the user does not wish to change, the process to recognize the second touch is entered 3630. It is appreciated that within embodiments of the present invention, that both touches can use the index finger, unlike the simultaneous touch method.

In one embodiment, the user interface is implemented in the application layer of the software, making use of the underlying touch-screen system, inclusive of the processor, applications and gesture software. When in the "beacon" mode, special software can be implemented with appropriate memory management functions to store the sets of triggers, actions and events. In this mode, dedicated configured events may be available to the user. Key functions, actions and events, already specified may be made available to the user through a dedicated menu appearing to the user when in beacon mode. A dedicated graphical user interface may be devised. Pre-programmed triggers, behaviors and events may be linked to specific applications. It is appreciated that a number of different well known interactions can place the system into beacon mode. As an example, it can be a single tap or a multiple tap on the sensor screen at a predefined screen location.

In another embodiment, a point of reference may be marked with subsequent actions reacting towards that point of reference. For example, a finger swipe closer to the point of reference may enable faster scrolling while a further distance provides a slower scroll. Picture manipulation can be done in similar exemplary way.

In another embodiment of the present invention, shortcut action triggers may be set, after a single hand movement in the beacon mode. Where the invented method of dual touch experience is chosen, the hardware can be simplified, if desired by the user since only single touch devices can be employed. A dual simultaneous touch technology requires double the processing power in terms of hardware and multiple touches beyond that require as many times the processing capability as the number of simultaneous touches. With embodiments of the present invention, if desired, the processing capability can be reduced to secure cost advantages as the simultaneous touch is replaced by two consecutive touches by the present invention and single touch devices can be used. This removes the need for simultaneous (parallel) processing.

With the touch interface mechanics described, multi-touch implementation is discussed in the context of the embodiments of the present invention. As mentioned above, a multi-touch in traditional terms involves use of two or more fingers simultaneously touching the screen and a dual touch involves the use of two fingers. An embodiment of the present invention allows a dual touch simulated interface in a way that substantially frees the simultaneous use of two fingers.

Figure 4:
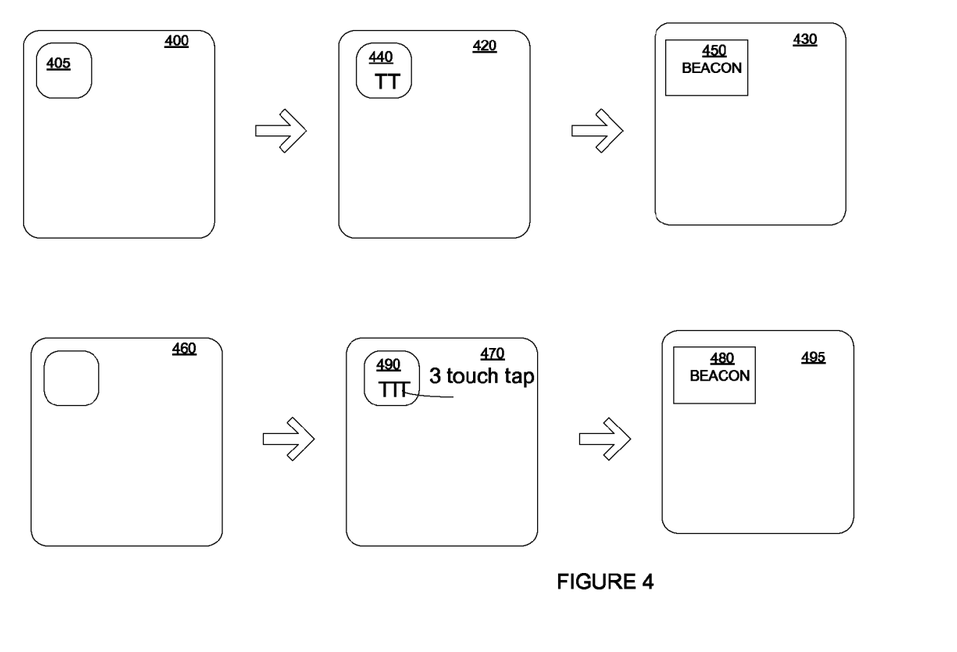
FIG. 4 is a diagram graphically illustrating placing the screen in the special "beacon" mode in accordance with embodiments of the present invention.

Referring to FIG. 4, a touch screen 400 is displayed with an exemplary location or spot on the screen 405. In one embodiment, spot 405 of screen 400 is touched or tapped as shown in 420. The label "T" signifies a "touch" by the user. A "TT" signifies a two tap touch. This touch, in one embodiment of the present invention, places the touch system in a "beacon" mode, which is a special mode in accordance with embodiments of the present invention. In another embodiment, shown by the bottom diagrams, the touch screen 460 is shown to transform to screen 470 where touch icon 490 is labeled with "TTT" to signify a three tap touch to enter the beacon mode. In one embodiment, this could be done anywhere on the screen. This produces screen 495 which is the screen in the "beacon" mode. The taps could be two or three taps in close succession, for instance. In one embodiment of the present invention, this is configurable, as part of user interface specification and could be any number of taps in any specified screen location over any time period.

Importantly, the "beacon" mode is the mode where the dual interface is executed in accordance with the embodiments of the present invention. Once the system is in the beacon mode, a point of reference is first inputted by the user. In one embodiment, this may be done by a pressure touch anywhere on the screen. In another embodiment, a specific spot is provided with the screen in the "beacon" mode and a trigger on the screen establishes a point of reference. With this established point of reference, a number of dual touch operations can advantageously be executed as described to follow.

Figure 5:
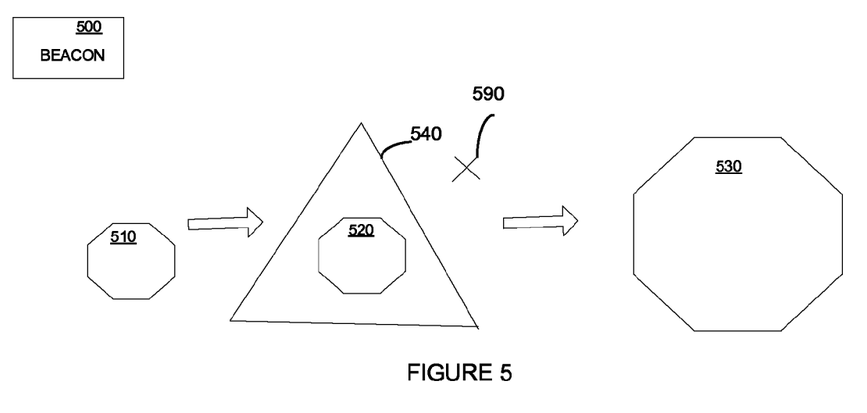
FIG. 5 is a diagram showing a "zoom in" on an object using a closed figure, like a triangle, in accordance with embodiments of the present invention.

Referring to FIG. 5, the screen is in a "beacon" mode 500. An object on the screen 510 is by way of example to be expanded or to be "zoomed in." By drawing a closed figure 540 surrounding the object, the "to be zoomed" space is conveyed to the application. This is done by a first user interaction drawing the triangle with a finger touch. The amount of zoom is conveyed by touching a point 590 on the touch screen. This is done by a subsequent user interaction touching the screen. The point specifies the amount of "zoom in." In accordance with embodiments of the present invention, the object is "zoomed in" to 530 and expanded in an area determined by the second point 590.

Figure 6:
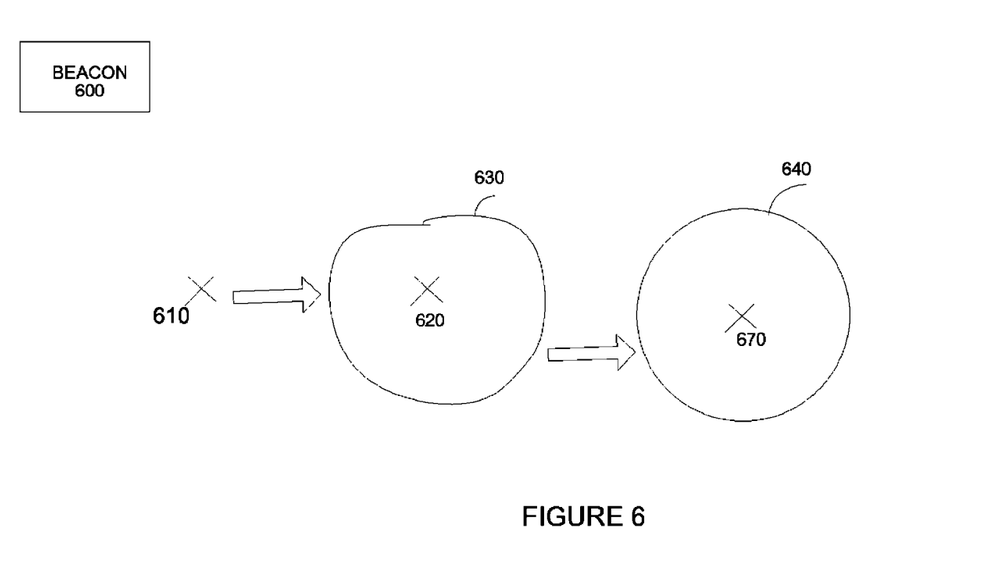
FIG. 6 illustrates a benefit of the single touch experience in which a circle is drawn by first selecting a point of reference and making an approximate closed circle, which is then perfected by the screen software as a perfect circle in accordance with embodiment of the present invention.

Referring to FIG. 6, the screen is already established in the "beacon" mode. Using a pressure touch mechanism, a point of reference is established 610 by a user touch. This is followed by a subsequent touch in which the user moving a finger around the point of reference 620. The movement of the finger is traced as 630. It is to be noted that in this embodiment of the present invention, the user has the option of using the index finger for tracing which is the preferred touch technique by most users. In the next transformed screen, the point of reference is shown as 670. The substantial circle drawn through 630 is recognized by the gesture software and a perfect circle 640 is replaced with the center as the point of reference. In a simultaneous two touch interface, the user, would have awkwardly moved the hand and fingers. Further due to physical constraints, two attempts would have been needed with the radius of the circle restricted to the stretch capability of the user's hand. In this embodiment of the invention, however, a circle can be easily drawn and the radius is not constrained because the two touches do not need to happen simultaneously, but are rather made in sequence.

Figure 7:
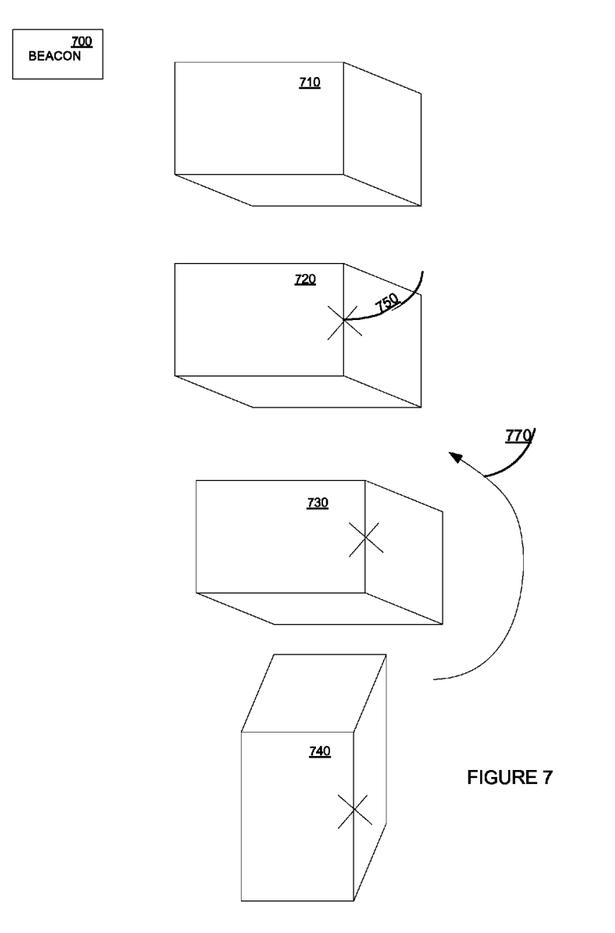
FIG. 7 illustrates an application in which rotation is done using a single finger in accordance with embodiments of the present invention.

FIG. 7 is illustrative of another use of an embodiment of the present invention. The screen is in the beacon mode 700. A three dimensional object 710 is placed on the screen by an application. A point of reference 750 is placed on the object 720 by user touch. A finger movement 770 is recognized as shown by the arrow as a subsequent interaction, with the touch system being in the "beacon" mode. The result is 740, where the figure moves as shown. The point around which the object turns is the designated point of reference by this mechanism and the amount of object rotation is defined by the amount of finger tracing 770 of the second user interaction. Importantly, a single finger interface is provided to rotate the object as shown in FIG. 7. Similar to the circle drawing example of FIG. 6, the interface is more user friendly because the dual touch interface is implemented in accordance with embodiments of the present invention, by first determining a point of reference and then, secondly, moving a single finger. The touches, however, do not need to occur simultaneously.

Figure 8:
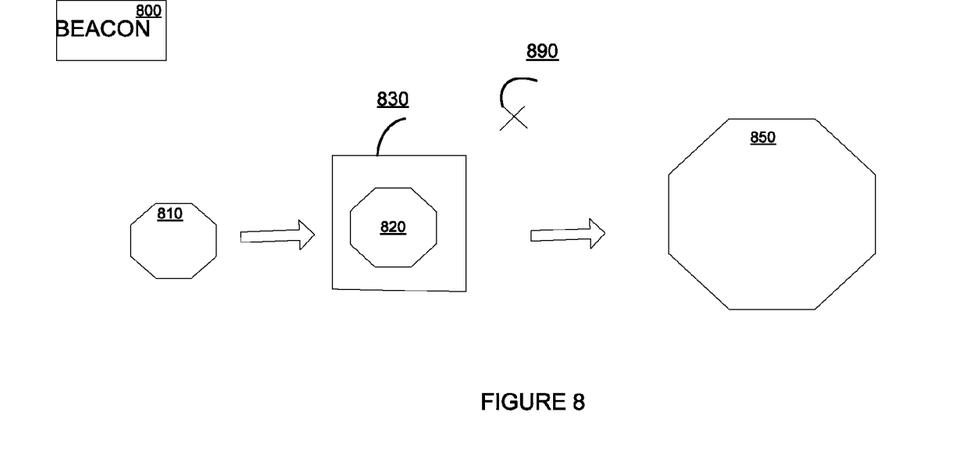
FIG. 8 is a diagram showing a "zoom in" on an object by drawing a closed line around it through the use of a square in accordance with embodiments of the present invention.

Referring to FIG. 8, the screen is in a "beacon" mode 800. An object on the screen 810 is by way of example to be expanded or to be "zoomed in." By drawing a closed figure 830, a square in this case, surrounding the object, the "to be zoomed" space is conveyed to the application in a first user interaction. The amount of zoom is next conveyed by touching a point 890 on the touch screen which represents a second user interaction. The point specifies the amount of "zoom in." The object is zoomed in 850 and expanded in an area determined by the second point 890.

Figure 9:
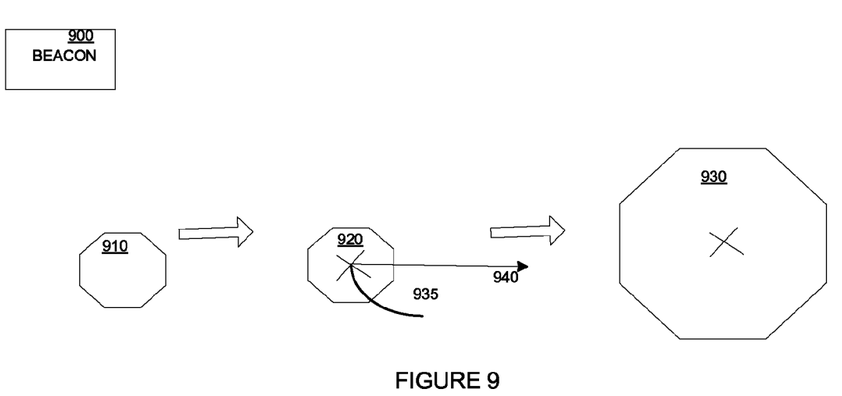
FIG. 9 illustrates a "zoom in" function using a point of reference and drawing of a line outwards in accordance with embodiments of the present invention.

FIG. 9 specifies another way that a "zoom in" function can be specified. The screen is in the beacon mode 900. A "to be zoomed" object is shown 910. A point of reference is marked 935 by a first user interaction. The object to be "zoomed in" is specified as 920 in the transformed screen. A line 940 is drawn by the user from the point of reference outwards in a second, subsequent, user interaction. The extent of the line specifies the amount of "zoom in." The screen transforms, with the object expanded or zoomed in as 930. Therefore, a dual touch interface is provided by the point of reference and a subsequent single touch method.

Figure 10:
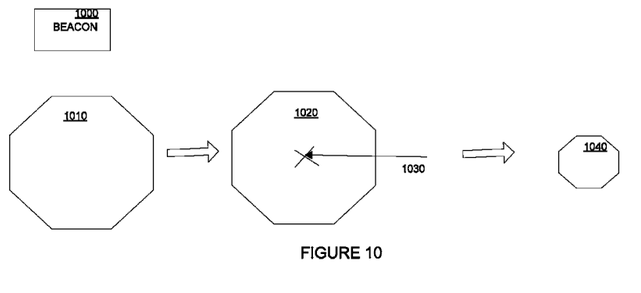
FIG. 10 illustrates a "zoom out" function using a point of reference and drawing of a line inwards in accordance with embodiments of the present invention.

In another embodiment of the present invention, FIG. 10 specifies the zoom out method by a similar process. The screen is in a "beacon" mode 1000. The object to be zoomed out is shown as 1010. A point of reference is placed in the middle of object to create a transformation screen 1020 by a first user interaction. A straight line 1030 is traversed inwards by the user which is the second user interaction, the length of the line indicative of the extent of the zoom out. The longer the line, the greater is the zoom out function. The object transforms to 1040.

In one embodiment of the invention, the amount of pressure determining whether a point of reference is desired is configurable because the amount of pressure applied on the screen varies on an individual's preference or style as well as physique.

In another exemplary embodiment of the present invention, three dimensional modeling and demonstrations are made more user friendly and subject to more natural user interactions. The interface is more susceptible to user control. Movement of objects is made easier by setting the point of reference and subsequently moving a single finger. This is more difficult with the simultaneous use of two fingers. Similarly, in another exemplary use, the continuous rotation of a three dimensional or two dimensional object is enabled easily by embodiments of the present invention. By setting a reference point on the object and moving the single finger around the object with a subsequent touch, a continuous rotation of the object can be achieved. Due to the limitations of the simultaneous use of two fingers, this function cannot readily be done.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A touch interface method comprising:
   responsive to a first user interaction with a touch screen, entering a first mode of operation;
   within the first mode of operation, recognizing a second user interaction with the touch screen, the second user interaction being to establish a point of reference;
   subsequent to the second user interaction and within the first mode of operation, recognizing a third user interaction with the touch screen wherein the third user interaction includes a finger swipe spaced a first distance to the point of reference to establish scrolling at a first speed; and
   subsequent to the second user interaction and within the first mode of operation, recognizing a user interaction including a finger swipe spaced a second distance to the point of reference to establish scrolling at a second speed, wherein the touch screen is a single touch sensitive touch screen comprising a flat panel display and wherein within a second mode of operation different from the first mode of operation, not recognizing the second user interaction as establishing the point of reference.

2. The method of claim 1, wherein said recognizing said second user interaction comprises identifying a point of reference responsive to a user touching said touch screen at said point of reference.

3. The method of claim 1, wherein said graphical function alters an image based on the distance between the point of reference and the gesture.

4. The method of claim 1, wherein said graphical function alters an image based on a shape of movement of said third user interaction relative to said point of reference.

5. The method of claim 1, wherein said touch screen is a an integrated flat panel display.

6. The method of claim 1, wherein said graphical function comprises revolve function.

7. The method of claim 1, wherein the graphical function alters the three dimensional image based on an amount of movement of the third user interaction relative to the point of reference.

8. The method of claim 1, wherein a fifth user interaction is recognized whilst in the first mode of operation to be a gesture to rotate a three dimensional image on the touch screen, and the method comprises automatically performing a graphical function that alters the image on the touch screen based on a relationship between the second and third user interactions such that the image is rotated about the point of reference in three dimensions.

9. A system comprising a processor, a single touch sensitive touch screen comprising a flat panel display, a bus and a memory, wherein said memory comprises instructions that when executed implement a method of touch interface, said method comprising:

responsive to a first user interaction with said touch screen, entering a first mode of operation;

within said first mode of operation, recognizing a second user interaction with said touch screen, the second user interaction being to establish a user-defined point of reference;

within a second mode of operation different from the first mode of operation, not recognizing the second user interaction when received as establishing the user-defined point of reference;

subsequent to said second user interaction within said first mode of operation, recognizing a third user interaction with said touch screen wherein said third user interaction includes a gesture to rotate an image on the touch screen; and automatically performing a graphical function that alters the image on said touch screen based on a relationship between said second and third user interactions such that the image is rotated about the user-defined point of reference.

10. The system of claim 9, wherein said recognizing said second user interaction comprises identifying the point of reference responsive to a user touching said touch screen at said point of reference.

11. The system of claim 10, wherein said recognizing said third user interaction comprises identifying a movement along said touch screen corresponding to said user touching said touch screen.

12. The system of claim 11, wherein said graphical function alters said image based on an amount of movement of said third user interaction relative to said point of reference.

13. The system of claim 11, wherein said graphical function rotates said image based on a shape of movement of said third user interaction relative to said point of reference.

14. The system of claim 9, wherein said touch screen is an integrated flat panel display.

15. The system of claim 9, wherein said graphical function comprises a revolve function.

16. The system of claim 9, wherein the image is a three dimensional image.

17. The system of claim 16, wherein the image is rotated about the point of reference in three dimensions.

18. The method of claim 9, wherein the gesture of the third user interaction is defined by an amount of finger tracing and the act of automatically performing a graphical function that alters the image on the touch screen such that the image is rotated about the user-defined point of reference includes rotating the image an amount established by the amount of finger tracing.

19. A computer memory that is not a transitory signal and that comprises executable by at least one processor for:

responsive to a first user interaction with a single touch sensitive touch screen, entering a first mode of operation;

within the first mode of operation, recognizing a second user interaction with the touch screen, the second user interaction being to establish a point of reference;

subsequent to the second user interaction and within the first mode of operation, recognizing a third user interaction with the touch screen wherein the third user interaction includes a user moving a single finger around the point of reference to establish a closed boundary around the point of reference, subsequent to receiving the third user interaction, receiving a user touch of a screen location outside the closed boundary;

responsive to the third user interaction and subsequent receipt of the user touch of the screen location outside the closed boundary, modifying an onscreen appearance of a graphical object within the closed boundary; and within a second mode of operation different from the first mode of operation, not recognizing the second user interaction as establishing the point of reference.

20. The computer memory of claim 19, wherein said recognizing said second user interaction comprises identifying a point of reference responsive to a user touching said touch screen at said point of reference.

21. The computer memory of claim 19, wherein said graphical function alters said image based on the distance between the point of reference and the gesture.

22. The computer memory of claim 19, wherein said graphical function alters said image based on a shape of movement of said third user interaction relative to said point of reference.

23. The computer memory of claim 19, wherein the instructions are executable for:

subsequent to the second user interaction and within the first mode of operation, recognizing a fourth user interaction with the touch screen wherein the fourth user interaction includes a gesture to rotate a three dimensional image on the touch screen; and automatically performing a graphical function that alters the image on the touch screen based on a relationship between the second and third user interactions such that the image is rotated about the point of reference in three dimensions.

* * * * *